3,101,248
PROCESS FOR THE MANUFACTURE OF ALKALI METAL CHLORITES AND ALKALINE EARTH METAL CHLORITES

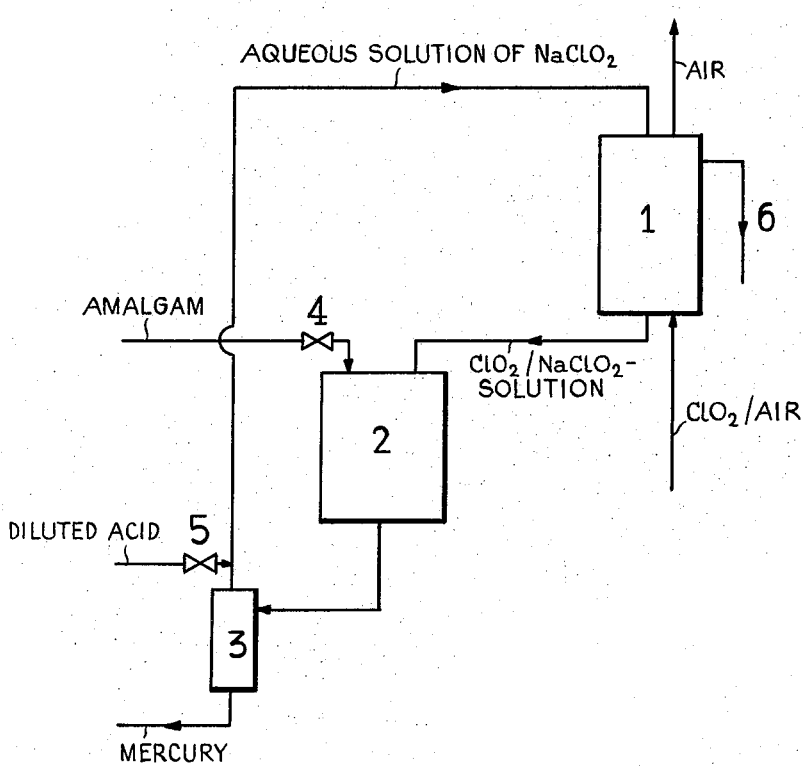

Rudolf Hirschberg and Helmut Hund, Frankfurt am Main, Germany, assignors to Farbwerke Hoechst Aktiengesellschaft vormals Meister Lucius & Brüning, Frankfurt am Main, Germany, a corporation of Germany
Filed Nov. 28, 1960, Ser. No. 71,900
Claims priority, application Germany Jan. 10, 1958
6 Claims. (Cl. 23—85)

The present invention relates to a process for the manufacture of alkali metal chlorites and alkaline earth metal chlorites. This application is a continuation-in-part of application Serial No. 785,040, filed January 5, 1959, now abandoned.

It is known to produce alkali metal chlorites or alkaline earth metal chlorites by reducing chlorine dioxide in an aqueous solution. Depending on the reaction conditions used, some reducing agents such as alkali metal amalgams or alkaline earth metal amalgams cause, however, side reactions which may lead to a considerable alkalinity of the solution.

When, for example, amalgams are used, an alkaline reaction is produced by the following side reactions:

$$ClO_2^- + 2H_2O + 4e^- = Cl^- + 4OH^- \qquad (1)$$
$$2Hg = Hg_2^{++} + 2e^- \qquad (2)$$

and/or by the decomposition, for example, of sodium amalgam $$2Na + 2H_2O = 2NaOH + H_2 \qquad (3)$$

Since, however, chlorine dioxide disproportionates in an alkaline medium according to the known equation $$2ClO_2 + 2OH^- = ClO_2^- + ClO_3^- + H_2O \qquad (4)$$

the yield of chlorite may be considerably reduced due to the formation of chlorate.

Attempts have been made to reduce the side reaction to a minimum in an appropriate manner. For example, by reducing the amalgam concentration in the amalgam reduction process, the reaction is conducted in a manner such that the side reactions (1 and 2) are less pronounced.

However, for technical reasons a minimum concentration has to be observed so that the portion of chlorate formed may amount, for example, to up to 10 mol percent of the total yield, calculated on the chlorine dioxide used.

The present invention provides a process for the manufacture of alkali metal chlorites and alkaline earth metal chlorites by the reduction of aqueous chlorine-dioxide solutions by means of alkali metal amalgams or alkaline earth metal amalgams, which process enables a further and, if desired, even considerable reduction of the chlorate concentration. The process of the present invention is conducted in a manner such that a dilute strong inorganic acid, such as nitric acid, sulfuric acid, or hydrochloric acid, for example, is continuously or discontinuously added to the solution in such an amount that the pH value is maintained between preferably about 7.0 and about 9.0. The normality of the dilute acid is advantageously 0.1 to 5.0.

The process of the invention can be used with special advantage for the continuous manufacture of alkali metal chlorites and alkaline earth metal chlorites.

In carrying out the process of the present invention, it has unexpectedly been found that the dilute acid may be added to a chlorite solution of a relatively high concentration, for example with a content of 10 to 30 percent by weight of sodium chlorite, at temperatures within the range of 0 to 40° C., without the chlorite decomposing, for example by local over-acidification.

A remarkable feature of this invention is, further, the introduction of dilute acid into the reaction solution even in the presence of the amalgam which is depleted of sodium after having been reacted with chlorine dioxide, especially when both liquid phases have been substantially separated by the formation of two layers.

The use of nitric acid involves the advantage that the sodium nitrate formed is an effective agent for preventing corrosion due to chlorine dioxide so that no useless ballast material is formed.

Some methods of operation according to the invention, which methods use sodium amalgam as reducing agent, are described hereinafter, without, however, limiting the application thereto. They are described by the following examples and illustrated in the accompanying diagrammatic drawing.

Example 1

In absorber 1, an aqueous solution containing 220 grams per liter of sodium chlorite and having a temperature of 15°–16° C. was adjusted to a content of chlorine dioxide of 1.22 grams per liter by blowing in chlorine dioxide of about 5 percent strength diluted with air. The solution was then cycled at a speed of 1,500 liters per hour, via reaction vessel 2, and separator 3. Through valve 4 sodium amalgam of 0.005 percent strength flowed into reaction vessel 2 at a rate of flow of 900 liters per hour and was then separated from the solution in separator 3. 8.4 liters per hour of nitric acid (normality 0.6) were introduced into the solution through valve 5 at a controlled rate while a corresponding volume per hour of sodium chlorite solution (220 g./l.) was drawn off through overflow 6. In this manner a pH value of 8.5 to 9.0 was maintained in the sodium chlorite solution.

The overflow contained, per hour, 2.3 kilograms of sodium chlorite, 70 grams of sodium chloride and 50 grams of sodium chlorate, i.e. of the chlorine contained in the solution, about 93 percent was in the form of chlorite, 5.0 percent was in the form of choride, and only 2 percent was as sodium chlorate.

Example 2

The process is carried out as described in Example 1, but 1628 liters per hour of aqueous sodium chlorite solution (220 grams per liter) having a content of 1.3 grams per liter of dissolved chlorine dioxide are brought together at a temperature of 20° C., with 1525 liters per hour of sodium amalgam of 0.0035 percent strength. The separated solution is then adjusted to a pH value of 8.2 to 8.8 by adding thereto 7.6 liters per hour of 0.65 N-hydrochloric acid.

The overflowing solution contains per hour 1.965 kilograms of sodium chlorite, 0.364 kilogram of sodium chloride and 23.2 grams of sodium chlorate. This corresponds to a yield of 94 mol percent of sodium chlorite, 5 mol percent of sodium chloride, and 1 mol percent of sodium chlorate, calculated upon the chlorine dioxide used. 12.75 percent by weight of the solid material consist of the sodium chloride formed by the hydrochloric acid added.

Example 3

In absorber 1, 1434 liters per hour of an aqueous solution containing 230 grams per liter of sodium chlorite are adjusted to a content of chlorine dioxide of 1.2 grams per liter at 17°–18° C. by blowing in air containing about 5 percent by volume of chlorine dioxide and introduced in co-current with 1152 liters per hour of sodium amalgam of 0.004 percent strength through reaction vessel 2. 3.99 liters per hour of 1.14 N-sulfuric acid are added through valve 5 so that a pH value of 8.7 to 9.0 is maintained in the reaction solution.

The solution produced at overflow 6 contains, per hour, 1.25 kilograms of sodium chlorite, 60.7 grams of sodium chloride, and only 1.7 grams of sodium chlorate, which yields 92.9 mol percent of sodium chlorite, 7.0 mol percent of sodium chloride and 0.1 mol percent of sodium chlorate calculated on the chlorine dioxide used. 17.52 percent by weight of the solid material consists of sodium sulfate.

In another mode of proceeding according to the examples, the acid may be added at another position; for example, it may be directly introduced into absorber 1. To avoid local overacidification of the solution the acid is advantageously distributed as rapidly as possible, for example by means of a whirling or a strong current at acid valve 5.

What is claimed is:

1. In the process for the manufacture of metal chlorites by the reduction of aqueous chlorine dioxide solutions by contacting them with a reducing agent selected from the group consisting of alkali metal amalgams and alkaline earth metal amalgams, the improvement which comprises adding a dilute inorganic acid selected from the group consisting of nitric, hydrochloric, and sulfuric acids to the aqueous chlorine dioxide solution at a temperature between 0° C. and 40° C. in such a quantity that the pH value is maintained between about 7.0 and about 9.0 said dilute acid having a normality between 0.1 and 5.0.

2. The process according to claim 1, wherein the acid is continuously added to the solution.

3. The process according to claim 1, wherein the acid is discontinuously added to the solution.

4. The process according to claim 1, wherein the acid is dilute nitric acid.

5. The process according to claim 1, wherein the acid is dilute hydrochloric acid.

6. The process according to claim 1, wherein the acid is dilute sulfuric acid.

References Cited in the file of this patent

FOREIGN PATENTS

| | | |
|---|---|---|
| 480,125 | Canada | Jan. 8, 1952 |
| 628,487 | Great Britain | Aug. 30, 1949 |
| 672,197 | Great Britain | May 14, 1952 |